United States Patent [19]

Georgopulos

[11] Patent Number: 4,584,786

[45] Date of Patent: Apr. 29, 1986

[54] INFORMATION PANEL ASSEMBLY

[75] Inventor: Thomas Georgopulos, Clearwater, Fla.

[73] Assignee: GTE Automatic Electric Inc., Northlake, Ill.

[21] Appl. No.: 452,691

[22] Filed: Dec. 23, 1982

[51] Int. Cl.[4] .............................................. G09F 9/00
[52] U.S. Cl. ..................................... 40/448; 340/765; 340/717
[58] Field of Search .................... 40/448, 158 R, 446, 40/447, 541; 340/711, 716, 719, 765, 717; 350/331 R

[56] References Cited

U.S. PATENT DOCUMENTS

| | | | |
|---|---|---|---|
| 3,771,855 | 11/1973 | Burns | 340/765 |
| 3,976,995 | 8/1976 | Sebestyen | 340/717 |
| 4,184,153 | 1/1980 | Glaubitz | 340/765 |
| 4,367,467 | 1/1983 | Emile, Jr. | 340/765 |
| 4,398,819 | 8/1983 | Schron | 340/716 |
| 4,403,216 | 9/1983 | Vokoi | 40/448 |

FOREIGN PATENT DOCUMENTS 2839009 3/1979 Fed. Rep. of Germany .... 40/158 R
2515401 4/1983 France ................................... 40/765

Primary Examiner—Gene Mancene
Assistant Examiner—James Hakomaki
Attorney, Agent, or Firm—Anthony Miologos; Peter Xiarhos

[57] ABSTRACT

An information panel assembly comprised of liquid crystal display devices, positioned on a mounting member and sandwiched between a cover member and a circuit member. Elastomeric connectors connect the liquid crystal display devices to drive circuitry on the circuit member. The cover member includes rear projecting members which are accepted by apertures on the circuit member and are disposed to engage threaded fasteners, locking the assembly together. A switch member including a matrix of membrane switches is mounted over the cover member connecting each switch to the circuit member thereby, selectively controlling the information displayed.

12 Claims, 2 Drawing Figures

INFORMATION PANEL ASSEMBLY

BACKGROUND OF THE INVENTION

This invention relates in general to information display panels and more particularly to an information display panel assembly using liquid crystal devices.

Liquid crystal displays are a well-known means of providing information to a user in a compact and economical manner. In general, liquid crystal displays utilize crossed electrical conductive members. By energizing two particular conductors, the point at which the conductors cross a luminescence media is subjected to the desired excitation, thereby, causing luminescence at that point. By the proper sequence of energizing the conductors a display appears to the eye in the form of pictures, numbers, etc. Numerous cathode ray type devices supply the same type of display, however, these are generally rather bulky and require panels that have considerable depth. As can be appreciated liquid crystal display devices occupy less space, however, the devices have heretofore generally had problems with terminating the large amount of connections required to drive the liquid crystal display segments. Considering that each liquid crystal display may have 100 or more individually driven segments an orderly and compact means of connecting and packaging the display to the drive circuitry is advantageous.

SUMMARY OF THE INVENTION

In accordance with the present invention there is provided an information panel assembly including a liquid crystal display, mounting and connecting hardware and drive circuitry formed into a homogeneous unit. The drive circuitry is located on a rear face of a circuit member which also includes a first and a second plurality of orifices extending from a front face to the rear face. The circuit member also includes a plurality of spaced contacts formed in rows on its front face which carry the control signals developed by the drive circuitry.

At least one mounting member having a liquid crystal display accepting area and a plurality of apertures and alignment pins projecting from the mounting member is arranged to mount on the circuit member front face. Each alignment pin is accepted by a different one of the circuit member first plurality of apertures. This allows the apertures on the mounting member to align with the second plurality of apertures on the circuit member. The mounting member further includes a longitudinally oriented slot which opens to a respective row of electrical contacts on the circuit member.

A connector having a plurality of spaced terminals is mounted within the mounting member slot, allowing one end of each terminal to engage a respective electrical contact.

A liquid crystal display device including a row of spaced contacts is mounted into the mounting members display accepting area. The display devices contacts engage a respective opposite end of each connector terminal, thereby, connecting the display to the drive circuitry and the control signals.

A cushion member is added over the mounting member in order to absorb any shocks or pressure exerted by the assembly on the fragile glass plates of the liquid crystal display.

The display is completed by a cover member having at least one window and a plurality of rear projecting members. Each rear projecting member includes a threaded bore. The cover member is disposed to mount over the mounting member and cushion member rendering the display device visible through the window and allowing the rear projecting members to be inserted into the aligned cover member and circuit member apertures. This allows threaded fasteners to engage the rear face of the circuit member and the threaded bores of each rear projecting member. The cover member therefore locks to the circuit member, sandwiching the remaining components of the assembly between these two members.

Where required, the assembly may also include a switch panel having generally the same configuration as the cover member and including a matrix of touch-sensitive switches. The switches may be connectable to the drive circuitry, selectively controlling particular types of information which may be displayed by the liquid crystal displays.

BRIEF DESCRIPTION OF THE DRAWINGS

A better understanding of the invention may be had from the consideration of the following detailed description taken in conjunction with the accompanying drawing in which.

DESCRIPTION OF THE PREFERRED EMBODIMENT

Figure 1:
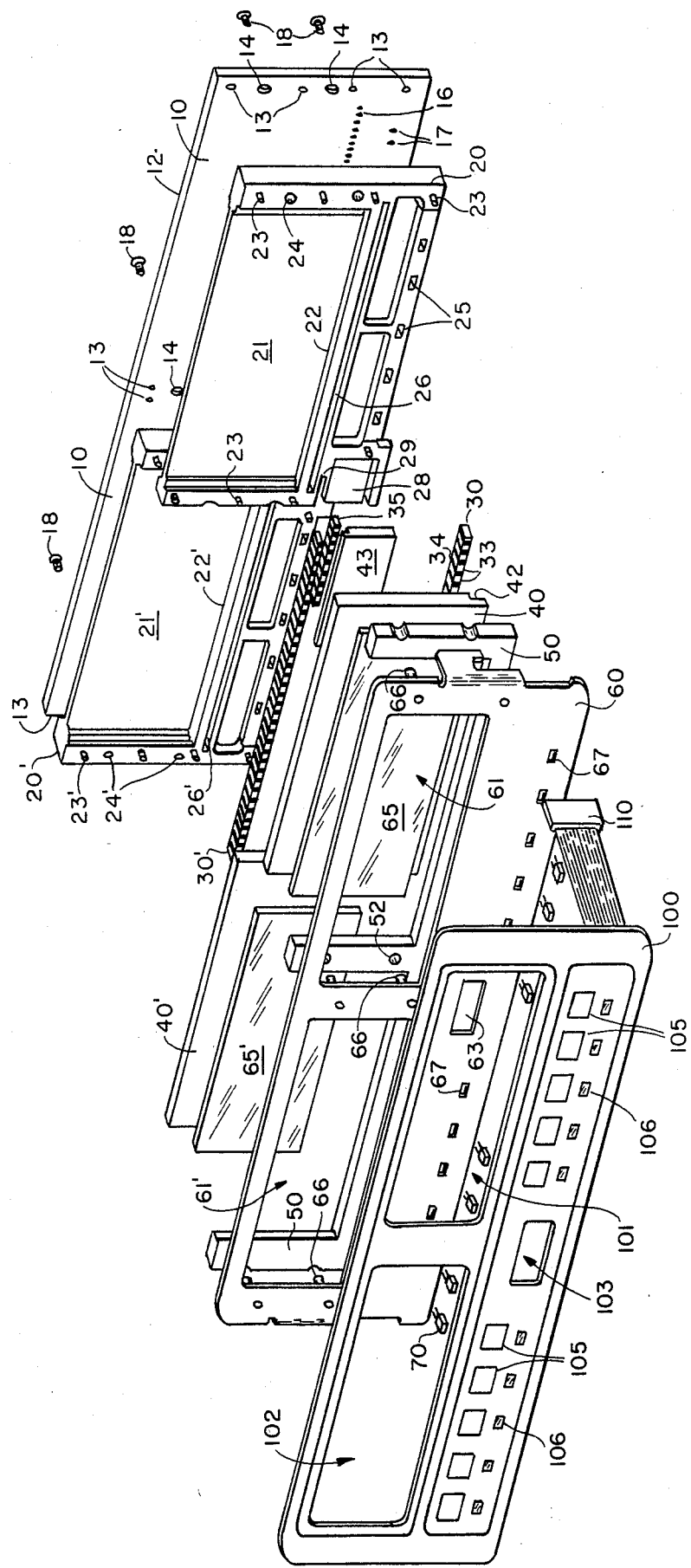
FIG. 1 is an exploded perspective view of the information panel assembly in accordance with the present invention.
Figure 2:
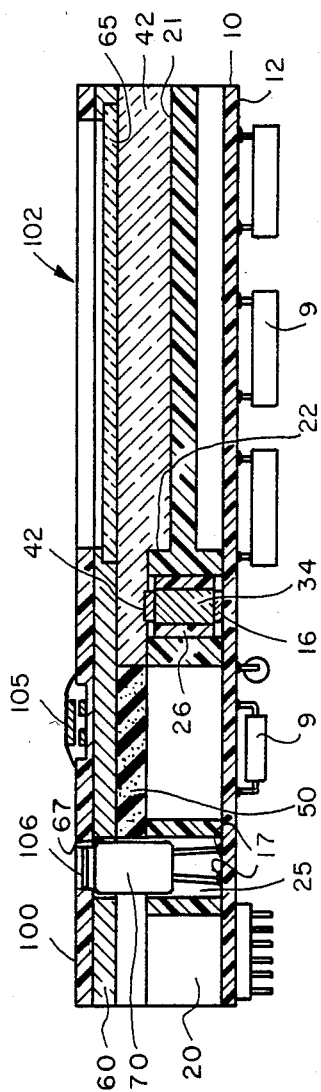
FIG. 2 is a transverse sectional view taken through the assembled information display.

With reference to FIG. 1 and FIG. 2 there is shown the information panel assembly in accordance with the present invention. The assembly comprises a circuit member or circuit board 10 having a front face 11 and a rear face 12. The circuit boards rear face 12 includes circuitry and components 9 which drive the liquid crystal displays, and may comprise any number of discrete and/or integrated circuit packages. The circuit board 10 also includes a number of apertures grouped in first and second sets 13 and 14, respectively. The apertures are positioned on non-conductive areas of the circuit board and form an access from the front face to the rear face of the circuit board.

The next component of the assembly is a pair of mounting members 20 and 20' which are both substantially alike. Each member is molded from a thermoplastic material and is identically alike front and rear. Therefore, the front face shown for member 20' is identical to the rear face of membe 20, which is not shown.

Each mounting member 20 and 20' further includes a liquid crystal display accepting area 21 and 21' defined by a U-shaped shoulder 22, 22'. A set of alignment pins 23, 23' extend from the front and rear of each mounting member 20, 20' with the rear pins (not shown) disposed to be accepted within a respective circuit board aperture 13. This allows the mounting member to register on the circuit board thereby, aligning apertures 24, 24' on each of the mounting members to apertures 14 on the circuit board.

A longitudinal slot 26, 26' located below each liquid crystal display accepting area 21, 21' respectively, extends an opening from the mounting member to a respective row of contacts 16 located on circuit board 10. It should be noted that these contacts connect to the drive circuitry on the rear face 12 of the circuit board. Finally, as can be seen in FIG. 1, a portion of a third display area 28 and a slot 29 is included on each mounting member 20 and 20'. When both the mounting members are assembled on the circuit board, they combine to form a third display accepting area and a third slot. The third slot 29 opens to a third set of contacts on the circuit board. Each of the three slots 26 and 26' and 29 are arranged to accept elastomeric connectors 30, 30' and 35 therein, respectively.

Each elastomeric connector is composed of alternate sections of insulative material 33 and conductive material, with the conductive material forming terminals 34. The connector is sized to fit within an associated slot allowing one end of each terminal 34 to engage an individual and respective contact 16. With connectors 30, 30' and 35 located within respective slots 26, 26' and 29 the liquid crystal displays may then be assembled to mounting members 20, 20'. Each liquid crystal display 40, 40' and 43 is arranged to seat within its respective accepting area 21, 21' and 28. Displays 40, 40' and 43 each include a contact area 42, 42' and 44 respectively, having a row of contacts (not shown) which engage an opposite end of an individual terminal 34 of elastomeric connectors 30, 30' and 35, respectively. When properly seated the appropriate contacts 42, 42' and 44 of the liquid crystal displays are connected to a corresponding contact 16 on the circuit board through a terminal 34 of the elastomeric connectors as can be seen on FIG. 2.

A cushion member 50 is applied to selected portions of the mounting members 20, 20 and is intended to absorb any shocks or pressure exerted on the assembly thereby, protecting the fragile glass plates of the liquid crystal displays 40, 40' and 43.

A cover member 60 normally stamped from a suitable metal or other rigid material is used to lock the assembly together. The cover member 60 includes window areas 61, 61' and 63 which registers with the liquid crystal displays 40, 40' and 43, respectively. As can be more readily seen on FIG. 2, each window area 61 and 61' includes a shoulder on its rear face, allowing a glass plate 65 and 65' respectively, to be installed thereat.

The cover member also includes a set of rear projecting members 66 which are arranged to be accepted through cushion member accepting areas 52, mounting member apertures 24, 24' and apertures 14 of circuit board 10. The end portion of each projection member 66 forms a flush surface with the rear face 12 of circuit board 10. Each rear projecting member 66 also includes a threaded bore, arranged to accept a threaded fastener 18 inserted from the rear face 12 of the circuit board. The fasteners 18 lock the cover member to the circuit board 10, sandwiching the mounting members 20, 20', the liquid crystal displays 40, 40 and 43 and the cushion member 50 between the cover member and the circuit board. The projection members 23 which project forward toward the cover member 60 provide standoffs between the cover member and each mounting member 20, 20', further protecting the fragile glass plates of the liquid crystal displays from over tightening during assembly.

As can be more readily seen on FIG. 2, the assembly also includes openings 67 on cover member 60 which corresponds to openings 25 and 25' on mounting members 20 and 20', respectively. These openings allow the installation of light emitting diodes 70 within each opening providing an access to connection points 17 on circuit member 10.

The assembly is completed by the use of a switch member 100 having the same general configuration as the cover member 60. The switch member includes 3 window areas 101, 102 and 103 allowing the liquid crystal displays to be visible therethrough. The switch member 100 also includes a matrix of touch sensitive switches 105 of the type where two conductors are encapsulated in a resilient dome, and at the urging of the dome, one conductor contacts the other making a switch closure. A grouping of windows 106 forming a transparent membrane over each LED allows each LED 70 to be visible through the window 106 when lit. Switches 105 may be connected to the drive circuitry via a connector 110, allowing a user to enter or select information which may be displayed on the liquid crystal displays.

While there has been shown and described what at the present is considered the preferred embodiment of the invention, it would be obvious to those skilled in the art that various changes and modifications may be made therein without departing from the scope of the invention as defined by the appended claims.

What is claimed is:
1. An information panel assembly comprising:
a circuit member including a front and a rear face, a first and a second plurality of apertures forming openings between said front and rear faces and at least one row of spaced contacts, said contacts connected to a source of control signals, and said circuit member further including a plurality of light emitting diode circuit connection areas, said light emitting diode circuit connection areas connected to said source of control signals;
at least one mounting member having a display accepting area, a plurality of spaced openings and a plurality of apertures and alignment pins projecting from said mounting member, said mounting member arranged to mount to said circuit member front face with each of said mounting member alignment pins accepted by a different one of said circuit member first plurality of apertures, and each of said circuit member second plurality of apertures aligned with a corresponding mounting member aperture, said mounting member further including at least one slot, opening to said circuit member row of electrical contacts;
a connector having a plurality of spaced terminals, said connector mounted within said mounting member slot with one end of each terminal engaging a respective one of said circuit member electrical contacts;
a display device including a row of contacts, said display device mounted to said mounting member display accepting area and said display device contacts engaging a respective one of an opposite end of said connector terminals, connecting said display device to said source of control signals; and
a cover member including a plurality of spaced openings, at least one window and a plurality of rear projecting members each of said projecting members including a threaded bore, said cover member mounted over said mounting member rendering said display device visible through said window, and said cover member openings in alignment with said mounting member openings, each of said aligned cover member and mounting member openings arranged to accept a light emitting diode therein, connecting each light emitting diode to a respective one of said circuit members circuit connection area and to said source of control signals, and each rear projecting member inserted into a respective and associated mounting member and circuit member second aperture, with each projecting member bore arranged to accept a threaded fastener therein from said circuit member rear face, locking said cover member to said circuit member.

2. An information panel assembly as claimed in claim 1, wherein: there is included a cushion member formed from a resilient material and installed between said cover member and said mounting member.

3. The information panel assembly as claimed in claim 1, wherein: said mounting member display accepting area comprises a U-shaped opening having a recessed shoulder area and said shoulder area is arranged to accept said display device therein.

4. An information panel assembly as claimed in claim 1, wherein: said display device is a liquid crystal display arranged to display information when a control signal is applied.

5. The information panel assembly as claimed in claim 1, wherein: said cover member includes a front face and said cover member front face arranged to accept a switch panel having substantially the same configuration as said cover member front face, said switch panel including a matrix of switches arranged to connect to said source of control signals.

6. An information panel assembly as claimed in claim 1, wherein: said connector is an elastomeric connector and said elastomeric connector is resiliently held within said cover member slot.

7. An information panel assembly comprising:
a circuit member including a front and a rear face, a plurality of first and a second apertures forming openings between said front and rear faces and a first and second row of spaced contacts, said contacts connected to a source of control signals, and said circuit member further including a plurality of light emitting diode circuit connection areas, said light emitting diode circuit connection areas connected to said source of control signals;
first and second mounting members each having a display accepting area, a plurality of spaced openings and a plurality of apertures and alignment pins projecting from said mounting member, each of said mounting members arranged to mount to said circuit member front face with each of said mounting member alignment pins accepted by a different one of said circuit member plurality of first apertures, and each of said plurality of second circuit member apertures aligned with a corresponding mounting member aperture, said first mounting member and said second mounting member each further including a slot, opening to said circuit member first and second row of electrical contacts respectively;
first and second connectors each having a plurality of spaced terminals, said first and second connectors mounted within said first and second mounting member slots respectively, with an end of each connector terminal engaging a respective one of said circuit member electrical contacts;
first and second display devices each including a row of contacts, each of said first and second display devices mounted to said first and second mounting members display accepting areas respectively, and each display device contact engages a respective one of an opposite end of said first and second connector terminals connecting said display device to said source of control signals; and
a cover member including a plurality of spaced openings, first and second windows and a plurality of rear projecting members each of said projecting members including a thread bore, said cover member mounted over said first and second mounting member rendering said first and second display device visible through said first and second windows respectively, and said cover member openings in alignment with said mounting member openings, each of said aligned cover member and first and second mounting member openings arranged to accept a light emitting diode therein, connecting each light emitting diode to a respective one of said circuit members circuit connection area and to said source of control signals, and each rear projecting member inserted into a respective and associated mounting member and circuit member second aperture, with each projecting member bore arranged to accept a threaded fastener therein from said circuit member rear face locking said cover member to said circuit member.

8. An information panel assembly as claimed in claim 7, wherein: said first mounting member and said second mounting member each further including a portion of a third display accepting area and each including a portion of a third slot, whereby, a third accepting area and a third slot opening is formed when said first mounting member and said second mounting member are mounted to said circuit member.

9. An information panel assembly as claimed in claim 7, wherein: said circuit member further includes a third row of spaced contacts connected to said source of control signals and said third slot opens to said third row of contacts arranged to accept a third connector therein.

10. An information panel assembly as claimed in claim 7, wherein there is provided a third display device arranged to be accepted in said mounting member third display accepting area and said display device including a row of contacts connected to said third connector, connecting said display device to said source of control signals.

11. An information panel assembly as claimed in claim 7, wherein: said cover member further includes a third window and said third display device is rendered visible through said third window when said cover member is mounted over said first and second mounting members.

12. An information panel assembly as claimed in claim 7, wherein: said first and second mounting members include a front face, and each of said front faces are arranged to accept a switch panel including a matrix of switches arranged to connect to said source of control signals.

* * * * *